Figure 1:
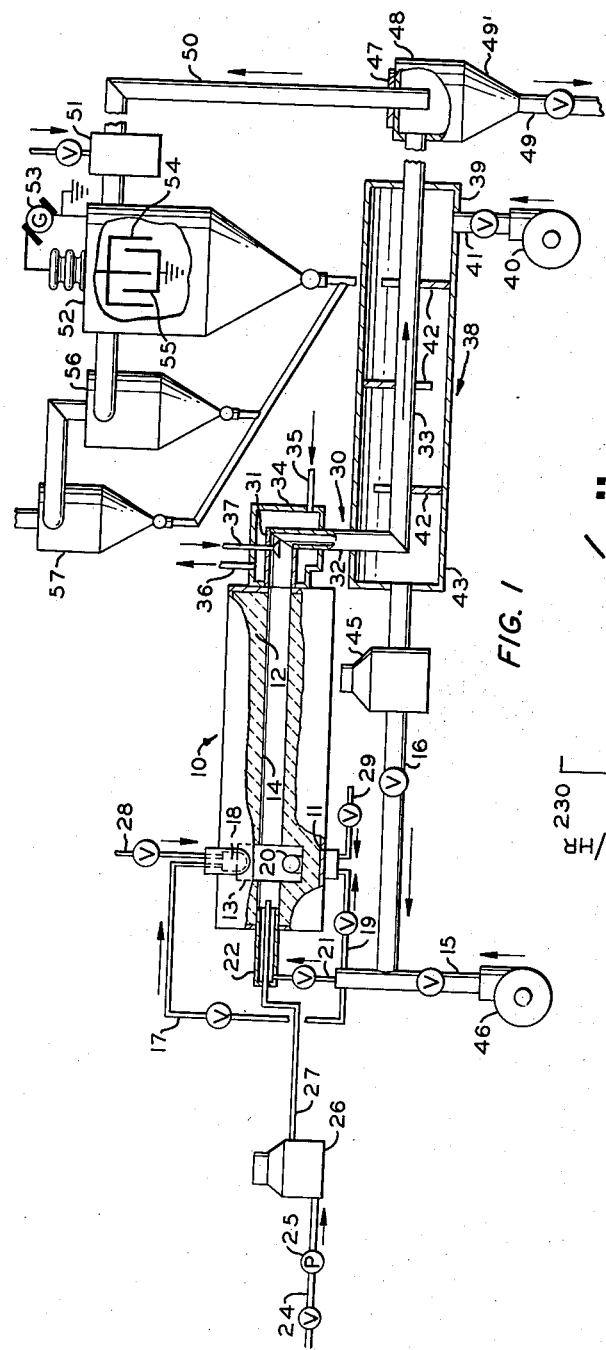

Jan. 3, 1961

C. J. HELMERS 2,967,090

PRODUCTION OF CARBON BLACK

Filed Aug. 15, 1958

INVENTOR.
C. J. HELMERS
BY Hudson and Young
ATTORNEYS

United States Patent Office 2,967,090
Patented Jan. 3, 1961

2,967,090

PRODUCTION OF CARBON BLACK

Carl J. Helmers, Bartlesville, Okla., assignor to Phillips Petroleum Company, a corporation of Delaware Filed Aug. 15, 1958, Ser. No. 755,154

11 Claims. (Cl. 23—209.6)

This invention relates to a method of and apparatus for producing carbon black. In another aspect, it relates to a method of separating hard particles, such as grit, from an effluent stream containing carbon black, combustion gases and such hard particles.

This application is a continuation-in-part of my co-pending application, Serial No. 278,155, filed March 24, 1952, and now abandoned.

Carbon black of the furnace type is produced by the pyrolytic cracking of a hydrocarbon feed stock, such as a heavy gas oil, in a reaction zone maintained at high temperature. In one particularly successful process, the hydrocarbon feed stock is introduced axially into an enlarged cylindrical reaction zone, and a stream of air or hot combustion gases is introduced tangentially into such zone. As a result, the axial hydrocarbon stream is surrounded by a spirally swirling blanket of air or air and combustion gases. From the enlarged reaction zone, the reactants flow into an elongated reaction zone of reduced diameter, after which the effluent is quenched and cooled. The cooled effluent is passed to a recovery system for separating the carbon black from the gaseous products of combustion, this separation zone ordinarily including an electrostatic precipitator followed by one or more cyclone separators. The separated carbon black is then pulverized, after which it is subjected to treatment, such as pressing or pelleting, to increase its density to such an extent that it can be readily packed in bags or transported in tank cars.

Carbon black plants of this type ordinarily incorporate a large number of individual reactors, some or all of which are connected to a common separation system. Hence, in order to produce a given quantity of carbon black, a predetermined number of reactors must be provided. It is evident that, if the capacity or throughput of the reactors could be substantially increased, such a given quantity of carbon black could be produced with a smaller number of reactors, thereby considerably decreasing the capital investment required for a carbon black plant of a given capacity. Alternatively, such increases in capacity would permit a plant having a given number of reactors to produce a larger quantity of carbon black without the necessity for an additional investment in reactors.

An increase in the capacity or throughput of an individual carbon black reactor can be effected by preheating the air supplied to the reaction zone, this being true whether the air is introduced directly or admixed with a fuel material, such as natural gas, and burned, the resulting combustion gases being introduced tangentially into the reaction zone. It has also been found that when preheated air is employed the carbon black yield, that is, the number of pounds of carbon black produced per gallon of hydrocarbon feed stock introduced into the reactor, can be substantially increased merely by increasing the feed rate. Unfortunately, when the yield from the reactor is increased in this manner relatively large amounts of grit are formed in the carbon black produced by the process. The grit formed is of three types, namely, (1) magnetic material which can be separated by an electromagnet and which results from attrition of metal parts of the reaction system by the black particles and gases, (2) combustible or carbonaceous grit, which can be defined as relatively hard aggregates of carbon, as distinguished from the flocculent relatively soft carbon black produced as the desired product, and (3) non-combustible grit resulting from attrition of the refractory parts of the reactor by the carbon black particles and gases. Where the black is to be used for rubber compounding, the users of the black establish a maximum tolerance for 80-mesh grit of 0.005 percent. This material has the undesirable effects of decreasing the abrasion resistance of the rubber product incorporating the gritty material, adversely affecting the stress-strain properties of the rubber product, and decreasing the reinforcing value of the carbon black. Although the process variables of the carbon black system can be adjusted so as to minimize grit formation, even where preheated air is used, such adjustments normally lose most or substantially all of the benefits gained by increasing the reactor capacity and the yield of carbon black obtained from a given hydrocarbon feed stock.

Excess grit, in a preferred embodiment of the invention, is removed by providing an enlarged separation zone downstream of the carbon black reactor in which the grit particles are allowed to settle out, the carbon black and gaseous combustion products being removed overhead and passed to the precipitator or other means for separating the carbon black from the gaseous combustion products. In this manner, preheated air and increased feed rates can be used with resultant increase in yield and reactor throughput and the quality of the black is not impaired by the presence of excessive quantities of gritty material therein. It is also within the scope of the invention to employ other methods for separating excess grit from the carbon black, such as for example, by screening, by electrical precipitation, by washing, etc. Advantageously, in connection with the separation system, part or all of the preheated air can be obtained by heat exchange with the hot effluent from the reaction zone, the heat exchanger being located adjacent the usual cooling conduit leading from the reactor outlet to the separation system.

It is an object of the invention to provide an improved process for increasing the yield of carbon black and providing greater reactor throughput in a carbon black plant without the presence of excessive quantities of gritty material in the product.

It is a further object to provide an improved separation system for removing gritty materials from an effluent containing such materials, carbon black, and gaseous combustion products.

It is a still further object to provide a system for decreasing the capital investment required in a carbon black plant without sacrificing the quality of the product.

Figure 2:
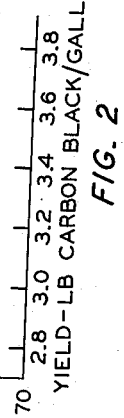

Various other objects, advantages and features of the invention will become apparent from the following detailed description taken in conjunction with the accompanying drawing, in which:

Figure 1 is a diagrammatic view illustrating a carbon black plant constructed in accordance with the invention; and Figure 2 is a graph of carbon black yield versus hydrocarbon oil feed to a reactor, such as in Figure 1.

Referring now to Figure 1, I have shown a reactor 10 having an outer steel shell 11 of cylindrical configuration. Mounted within the shell 11 is a mass of refractory material 12, such as fire bricks, which defines an enlarged cylindrical reaction zone 13, the diameter of which is greater than its length, and a cylindrical reaction zone 14 of reduced diameter. The length of reaction zone 14 is greater than its diameter, and the diameter of reaction zone 14 is substantially less than that of reaction zone 13.

Air is supplied to the reactor from two headers 15 and 16 communicating with an air pipe 17 leading to a tangential burner 18 in reaction zone 13, and an air pipe 19 leading to a tangential burner 20 in said reaction zone 13, the burner 20 preferably being diametrically opposite the burner 18. The headers 15, 16 also communicate with an air pipe 21 leading to a conduit 22 which introduces the air axially into the reaction zones 13 and 14. Each of the air pipes is provided with a valve for regulating the flow of air therethrough.

A hydrocarbon feed stock is introduced to the reactor from a valved line 24 which includes a pump 25 and a preheater furnace 26. The preheated feed is introduced axially into the reaction zones 13, 14 through a tube 27 which is smaller than and concentric with the air introduction conduit 22.

Cooperating with the respective tangential burners 18 and 20 are a pair of valved fuel injection lines 28 and 29 which introduce material, such as natural gas or fuel oil, into the tangential burners. In the preferred embodiment of the process, the fuel and air are mixed with the burners and combustion takes place before the gases are introduced into reaction chamber 13.

It is to be understood that the carbon black furnace described represents a preferred embodiment of the invention. The invention is also applicable to a system where part or all of the hydrocarbon feed stock is introduced tangentially through the burners 18 and 20. In other embodiments, air alone is introduced into the tangential ports and only one cylindrical reaction chamber is utilized. Still further, the introduction of the axial air is an optional feature and the invention is applicable to carbon black reactors not utilizing a cylindrical reaction chamber.

The effluent from the reaction chamber 14 passes to a cooling conduit 30 which, in the embodiment shown, has three sections 31, 32 and 33. Section 31 and the upper part of section 32 are provided with a jacket 34 into which water or other cooling fluid is introduced through an inlet 35 and removed by an outlet 36. The section 31 also includes a water spray head 37. The water jacketed section and spray quickly quench the effluent from the reactor so that its temperature is rapidly reduced and the reaction is halted.

In accordance with the invention, the section 33 of conduit 30 is surrounded by a shell 38 and air is introduced into the end 39 of the shell remote from reactor 10 by a blower 40 and a valved inlet line 41. The shell 38 functions as a heat exchanger so that the air is heated and the effluent passing through conduit section 33 is cooled, the shell 38 being provided with blades or vanes 42 to obtain a more efficient contact between the air and surface of conduit section 33. From the end 43 of shell 38 adjacent the reactor 10, the heated air passes through a furnace 45 to the valved air header 16. It will be noted that air is supplied to header 15 by an auxiliary blower 46 so that the air stream can be preheated to the desired temperature by regulation of the relative amounts of air drawn in through the blowers 40 and 46.

The end of conduit section 33 remote from the reactor 10 communicates with an enlarged cylindrical separation unit 47, preferably a cyclone separator. The conduit section 33 terminates at a radial port 48 formed in the upper part of the separator, the heavy material separated by the unit 47 being downwardly withdrawn by a valved conduit 49 at the lower end of a tapered section 49'. The overhead product is removed from the cyclone separator by a conduit 50, the lower end of which is positioned just below the level of radial inlet port 48.

The conduit 50, in turn, communicates with the usual separation system for removing carbon black suspended in gaseous combustion products, this separation system including a water quench unit 51, an electrostatic precipitator 52, embodying a high potential generator 53 and two sets 54, 55 of electrically charged plates, together with a primary cyclone separator system 56 and a secondary cyclone separator system 57.

In the operation of the system, preheated air is fed through the pipes 17, 19 to the tangential burners 18, 20 at a rate of greater than 100,000 cubic feet per hour, preferably about 125,000 cubic feet per hour, and air is admitted through the axial conduit 22 at a rate of at least 3,000 cubic feet per hour, preferably 4,000 cubic feet per hour. Fuel, such as natural gas, is admitted through the lines 28, 29 at such a rate as to maintain an air to fuel ratio of about 15:1. The rate of gas flow is, therefore, approximately 8330 cubic feet per hour. More detailed explanation of the construction and operation of the reactor can be found in Patent 2,564,700 to J. C. Krejci.

A hydrocarbon feed stock, such as a heavy gas oil, is passed axially into the reaction zones through line 27 at the maximum possible rate at which no tar is formed in the reactor. When the system is operated in accordance with the principles of my invention, the oil feed rate is preferably greater than 200 gallons per hour and it can be as high as 240 or 250 gallons per hour, as compared with 175 to 190 gallons per hour with the same reactor, no grit separator and without preheated air. The reaction zone is maintained at a temperature of greater than 2600° F. by the flow of combustion gases at which temperature the hydrocarbon feed stock is pyrolytically cracked with resultant formation of carbon black. The increased reactor capacity and yield obtained by operation in accordance with the principles of my invention hereinafter described, results in the formation of relatively large amounts of gritty material along with the carbon black. As previously noted, the gritty material may be composed of hard carbonaceous material, metal particles resulting from attrition of the metal parts of the reactor, and non-combustible particles resulting from attrition of the refractory material of the reactor. In accordance with the invention, a sufficient amount of this material is removed in the separator 47 that there is no impairment of black quality nor of the quality of rubber products containing such black. In this connection, it will be noted that the material introduced radially into the port 48 is reduced in velocity by entering the relatively large chamber of separator 47. Accordingly, the grit particles, which are heavier than the carbon black, preferentially settle to the bottom of the separator and are withdrawn through conduit 49. A smoke is withdrawn through conduit 50 consisting of carbon black substantially free from gritty material suspended in the gaseous products of combustion from reactor 10. In the separator units 52, 56 and 57, the carbon black is separated from the gaseous combustion products.

The removal of grit effected by the cyclone separator 47 permits the reactor to be operated with preheated air with a resultant substantial increase in capacity or throughput of the reactor and in the yield of carbon black. Part or all of the preheating of the air is effected in the shell 38 by contacting the air with the metal conduit section 33 containing the effluent fed to the separator unit 47. The heated air is fed through furnace 45 to header 16 and the air inlet pipes of the reactor, the preheating being controlled by regulation of the fuel supplied to furnace 45, the blowers 40, 46 and the air header valves so as to provide a preheat temperature preferably greater than 400° F., and more advantageously as high as 500 or 550° F. In one comparative set of trial runs with preheated air, increasing the oil feed rate from 180 gallons per hour to 210 gallons provided an increase in carbon black yield of 0.3 to 0.4 pound per gallon of hydrocarbon feed, representing an increase of approximately 10 to 15 percent. Satisfactory removal of grit was obtained by the separator unit 47 so that the characteristics of the finished black were not impaired nor were the properties of rubber articles in which the carbon black was compounded.

Table I shows the results of typical runs made with preheated air both with and without the separator 47.

Table II presents comparative tests, including ASTM distillation ranges for the various feed oils employed in the runs of Table I.

TABLE I

| Run No. | Oil Rate, g.p.h. | Feed Stock No. | Air Preheat Temperature, °F. | 80 Mesh Grit, Percent | | | | | | | Abrasion Index | Yields, Lb. Carbon Black/Gal. of Oil Feed |
|---|---|---|---|---|---|---|---|---|---|---|---|---|
| | | | | Upstream of Separator | | Downstream of Separator | | Separator Samples | | | | |
| | | | | Total | Carbonaceous Grit | Total | Carbonaceous Grit | Total | Carbonaceous Grit | Recovered Black | | |
| P-201R1 | 175 | B-69 | None | 0.027 | 0.011 | (1) | (1) | (1) | (1) | (1) | 99 | 2.95 |
| P-276R1 | 210 | B-68 | 500 | 0.522 | 0.401 | (1) | (1) | (1) | (1) | (1) | 87 | 3.18 |
| P-277 | 195 | B-69 | 500 | 0.048 | 0.024 | (1) | (1) | (1) | (1) | (1) | 94 | 2.99 |
| P-278 | 180 | B-69 | 500 | 0.043 | 0.011 | (1) | (1) | (1) | (1) | (1) | 98 | 2.84 |
| P-273 | 215 | B-67 | 600 | 0.307 | 0.163 | (1) | (1) | (1) | (1) | (1) | 89 | 3.34 |
| P-424 [2] | 180.8 | | None | 0.364 | 0.346 | 0.049 | 0.032 | 7.08 | 6.46 | 92.92 | | |
| P-451R1 | 227 | B-108 | 550 | 0.121 | 0.117 | 0.040 | 0.030 | 37.2 | 29.2 | 62.8 | 99 | 3.67 |
| P-452 | 225.9 | | 550 | 0.098 | 0.095 | 0.018 | 0.015 | 35.7 | 30.4 | 64.3 | | |
| P-444 | 224 | B-106 | 500 | 0.102 | 0.095 | 0.023 | 0.014 | 45.9 | 33.0 | 54.1 | 101 | 3.62 |

[1] No separator used.
[2] Tangential port on cyclone separator. Position of oil inlet tube changed to promote grit formation.

TABLE II

*Properties of feed stocks*

| Feed Stock | B-67 | B-68 | B-69 | B-106 |
|---|---|---|---|---|
| Gravity, API | 22.4 | 23.3 | 23.4 | 21.7 |
| Distillation, ASTM: | | | | |
| IBP | 412 | 398 | 396 | 434 |
| 5% | 449 | 442 | 439 | 458 |
| 10% | 459 | 451 | 448 | 468 |
| 20% | 473 | 464 | 460 | 479 |
| 30% | 484 | 473 | 471 | 489 |
| 40% | 494 | 482 | 479 | 500 |
| 50% | 506 | 492 | 487 | 512 |
| 60% | 524 | 502 | 498 | 525 |
| 70% | 549 | 520 | 515 | 545 |
| 80% | 595 | 554 | 544 | 591 |
| 90% | 662 | 620 | 609 | 652 |
| 95% | | | | 675 |
| EP, Percent | 709 | 699 | 697 | 675 |
| Recovery, Percent | 97 | 98 | 99 | |
| Aniline Number, °F | 70.0 | 59.7 | 58.1 | 55.0 |
| Carbon Residue | | | | 0.44 |
| Saybolt Viscosity, 122° F | | | | |
| Specific Gravity | 0.9194 | 0.9141 | 0.9135 | 0.9237 |
| Pounds per Gallon | 7.656 | 7.612 | 7.607 | 7.691 |
| Correlation Index | 70.2 | 68.2 | 68.4 | 72.0 |

In all runs, the air to gas ratio was maintained at 15, the tangential air rate was 125,000 cubic feet per hour, and the axial air rate was 4000 cubic feet per hour.

Run R-201R1 was carried out without preheated air. It will be noted that the total grit produced was 0.027 percent, an acceptably low value, it being understood that the grid content is substantially reduced in the micropulverizer to below the specified maximum. Runs P-273, P-277 and P-276R1 show the rapid increase in grit content where preheated air was used and the oil rate was increased, no separating zone being provided. Run P-278 shows that the grit content can be reduced by reducing the oil feed rate when using preheated air. This, however, nullifies an important advantage of using preheated air. Runs P-451R1, P-452 and P-444 were made with the separator in operation, it being noted that the effluent upstream of the separator contained a grit content of from 0.098 percent to 0.121 percent, an unacceptably high value of grit. Downstream of the separator, the grit content was reduced to from 0.018 to 0.040 percent, an acceptably low value.

It was found that no adverse effect upon rubber properties was produced by samples taken from the foregoing runs in the "400" series, even where the rubber was compounded with the carbon black without micropulverization of the black. The column headed "Abrasion index" in the table indicates the resistance to abrasion of rubber products made with the blacks produced as compared to the abrasion resistance of a rubber product prepared from a standard black, a high abrasion index indicating superior quality of the rubber product in this respect. It will be noted that, when preheated air was used, the abrasion index decreased as the oil rate was increased up to the maximum oil rate possible for the production of tar free black, and the grit content of the samples increased in a corresponding manner, as will be evident, for example, from a comparison of the abrasion indices obtained in runs P-278 and P-276R1. With respect to the tests made with the grit separator in operation, it will be noted that rubber products made from the black had an abrasion index substantially the same as that of rubber products made from the control sample, it being understood that the latter products have an abrasion index of 100. Thus, the grit separator permits the use of preheated air and increased feed rates with resultant increase in yield and reactor throughput without producing any adverse effect in the abrasion index of rubber products manufactured from the black.

It will be noted that in runs P-276R1, P-277 and P-278, all of which were carried out at a preheat temperature of 500° F., the yield of carbon black increased from 2.84 pounds per gallon with a feed rate of 180 gallons per hour to 3.18 pounds per gallon at a feed rate of 210 gallons per hour. This constituted an increase of 0.34 pound per gallon, all of which can be attributed to the increased feed rate. It is further noted that in the "400 Series" runs, at still higher feed rates, the carbon black yield reached 3.67 pounds per gallon of feed.

Carbon black yields versus hydrocarbon feed rates for the above runs are plotted in Figure 2. The carbon black yields for the "400 Series" runs are slightly out of line which would be expected since the fed oils (B-106 and B-108) used in these runs were slightly more aromatic than the oils (B-68 and B-69) used in the other runs. However, immaterial of the difference in the feeds, the same general trend is noted in runs P-444 and P-451R, namely, that an increase in oil feed rate with a given preheat temperature, accompanied by the formation of excess grit, results in an increase in carbon black yield per unit of feed.

In run P-424, a tangential inlet was used on the cyclone separator 47 rather than a radial inlet. In the production of carbon black for use in rubber compounding in which a hydrocarbon feed stock and a preheated stream of air are introduced to a reaction zone and combustion gases containing carbon black are withdrawn from the reaction zone, the maximum allowable amount of grit particles in the carbon black effluent is 0.049 percent. Although satisfactory grit removal was obtained, a large amount of carbon black was present in the bottom product. Thus, the separator sample contained 92.9 percent carbon black representing an excessive wastage of the black. It is believed that excessive agglomeration of the black occurred when the tangential inlet was used resulting from the sliding contact of the black with the walls of the separator, as compared with the greater turbulence obtained with the radial inlet. This result indicates that the radial inlet is definitely superior to the tangential inlet. In certain of the tests, a damper or vane was inserted between the pipe 50 and the wall of the separator. No substantial variation in separation efficiency was observed as a result of the movement of this vane to different positions.

It will be evident that I have achieved the objects of my invention in providing a system where increased throughput and yield are obtained from a carbon black reactor without a sacrifice in the quality of the black, this resulting from operating with preheated air, increased feed rates and separation of excessive grit, as in separator unit 47. Further, by the use of the heat exchange shell 38, a portion of the heat contained in the effluent gases is used to preheat at least a portion of the air stream fed to the reactor. The principles of the invention are applicable to many different types of carbon black reactors and processes, other than the one herein described in detail although the preferred embodiment has given superior results in an actual test program.

I claim:

1. In a process for producing carbon black in which a hydrocarbon feed stock and a preheated stream of air are introduced to a reaction zone maintained under conditions of temperature whereby combustion takes place, in which carbon black is formed in admixture with combustion gases and in which combustion gases containing carbon black and an amount of grit particles less than the maximum allowable for the ultimate use of the carbon black are withdrawn from the reaction zone, the improvement which comprises increasing the hydrocarbon feed rate so that the quantity of grit particles in the reaction zone effluent is greater than said allowable maximum, introducing effluent from the reaction zone into an enlarged separation zone of such size that heavy particles preferentially settle to the bottom of said zone in an amount sufficient to reduce the grit particles in the reaction zone effluent below said allowable maximum and withdrawing an increased yield per unit of feed of carbon black particles of unimpaired quality overhead from the separation zone.

2. The process of claim 1 in which effluent gases from the reaction zone are introduced radially to the enlarged separation zone.

3. A process of claim 1 in which effluent gases from the reaction zone are introduced tangentially to the enlarged separation zone.

4. In a process for producing carbon black in which a hydrocarbon feed stock and a preheated stream of air are introduced to a reaction zone maintained under conditions of temperature whereby combustion takes place, in which carbon black is formed in admixture with combustion gases and in which combustion gases containing carbon black and an amount of grit particles less than the maximum allowable for the ultimate use of the carbon black are withdrawn from the reaction zone, the improvement which comprises increasing the hydrocarbon feed rate so that the quantity of grit particles in the reaction zone effluent is greater than said allowable maximum, introducing effluent from the reaction zone containing carbon black, grit particles and gaseous products of combustion radially into an enlarged separation zone of such size that heavy particles preferentially settle to the bottom of said zone in an amount sufficient to reduce the grit particles in a reaction effluent below said allowable maximum, downwardly withdrawing settled grit particles from the separation zone, withdrawing overhead from the separation zone the carbon black particles and gaseous products of combustion and separating an increased yield per unit feed of carbon black particles of unimpaired quality from the gaseous products of combustion.

5. In a process for producing carbon black in which a hydrocarbon feed stock and a preheated stream of air are introduced to a reaction zone maintained under conditions of temperature whereby combustion takes place, in which carbon black is formed in admixture with combustion gases and in which combustion gases containing carbon black and an amount of grit particles less than the maximum allowable for the ultimate use of the carbon black are withdrawn from the reaction zone, the improvement which comprises increasing the hydrocarbon feed rate so that the quantity of grit particles in the reaction zone effluent is greater than said allowable maximum, introducing reaction zone effluent containing carbon black, grit particles and gaseous products of combustion radially into an enlarged cylindrical separating zone of such size that the grit particles preferentially settle to the bottom of said zone in an amount sufficient to reduce the grit particles in the reaction zone effluent below said allowable maximum, downwardly withdrawing settled grit particles from the separating zone, upwardly withdrawing carbon black particles suspended in the hot products of combustion from a region of the separating zone below the region of introduction of the reaction zone effluent into said zone and separating an increased yield per unit of feed of carbon black of unimpaired quality from the gaseous products of combustion.

6. In a process for producing carbon black in which a hydrocarbon feed stock and a preheated stream of air are introduced to a reaction zone maintained under conditions of temperature whereby combustion takes place, in which carbon black is formed in admixture with combustion gases and in which combustion gases containing carbon black and an amount of grit particles less than the maximum allowable for the ultimate use of the carbon black are withdrawn from the reaction zone, the improvement which comprises increasing the hydrocarbon feed rate so that the quantity of grit particles in the reaction zone effluent is greater than said allowable maximum, introducing reaction zone effluent containing carbon black, grit particles and gaseous products of combustion radially into an enlarged cylindrical separating zone of such size that the grit particles preferentially settle to the bottom of said zone in an amount sufficient to reduce the grit particles in the reaction zone effluent below said allowable maximum, downwardly withdrawing settled grit particles from the separating zone, upwardly withdrawing carbon black particles suspended in the hot products of combustion from a region of the separating zone immediately below the region of introduction of the reaction zone effluent into said zone, introducing the combustion gases containing carbon black particles into an electrostatic precipitator wherein agglomeration and separation of carbon black particles takes place, separating the remaining carbon black particles from the gaseous products of combustion and recovering as total product an increased yield per unit of feed of carbon black of unimpaired quality.

7. In a process for the production of carbon black for use in rubber compounding in which a hydrocarbon feed stock and a preheated stream of air are introduced to a reaction zone maintained under conditions of temperature whereby combustion takes place, in which carbon black is formed in an admixture with combustion gases and in which combustion gases containing carbon black and not more than between about 0.027 and about 0.049 percent of grit particles are withdrawn from the reaction zone, the latter percentage being the maximum allowable for this use of the carbon black, the improvement which comprises increasing the hydrocarbon feed rate so that the quantity of grit particles in the reaction zone effluent substantially exceeds 0.049 percent, introducing effluent from the reaction zone into an enlarged separation zone of such size that heavy particles preferentially settle to the bottom of said zone in an amount sufficient to reduce the grit particles in the reaction zone effluent to below about 0.049 percent and withdrawing an increased yield per unit of feed of carbon black particles of unimpaired quality overhead from said separation zone.

8. The process of claim 7 in which the hydrocarbon feed rate is increased from between about 175 and about 190 gallons per hour to between about 240 and about 250 gallons per hour.

9. In a process for the production of carbon black for use in rubber compounding in which a hydrocarbon feed stock and a preheated stream of air are introduced to a reaction zone maintained under conditions of temperature whereby combustion takes place, in which carbon black is formed in an admixture with combustion gases and in which combustion gases containing carbon black and not more than between about 0.027 and about 0.049 percent of grit particles are withdrawn from the reaction zone, the latter percentage being the maximum allowable for this use of the carbon black, the improvement which comprises increasing the hydrocarbon feed rate so that the quantity of grit particles in the reaction zone effluent substantially exceeds 0.049 percent, introducing effluent from the reaction zone containing carbon black grit particles and gaseous products of combustion radially into an enlarged separation zone of such size that heavy particles preferentially settle to the bottom of said zone in an amount sufficient to reduce the grit particles in the reaction zone effluent to below about 0.049 percent, downwardly withdrawing settled grit particles from the separation zone, withdrawing overhead from the separation zone carbon black particles and gaseous product of combustion and separating an increased yield per unit of feed of carbon black particles of unimpaired quality from the gaseous products of combustion.

10. In a process for the production of carbon black for use in rubber compounding in which a hydrocarbon feed stock and a preheated stream of air are introduced to a reaction zone maintained under conditions of temperature whereby combustion takes place, in which carbon black is formed in an admixture with combustion gases and in which combustion gases containing carbon black and not more than between about 0.027 and about 0.049 percent of grit particles are withdrawn from the reaction zone, the latter percentage being the maximum allowable for this use of the carbon black, the improvement which comprises increasing the hydrocarbon feed rate so that the quantity of grit particles in the reaction zone effluent substantially exceeds 0.049 percent, introducing effluent from the reaction zone containing carbon black, grit particles and gaseous products of combustion radially into an enlarged cylindrical separating zone of such size that the grit particles preferentially settle to the bottom of said zone in an amount sufficient to reduce the grit particles in the reaction zone effluent to below about 0.049 percent, downwardly withdrawing settled grit particles from the separating zone, upwardly withdrawing carbon black particles suspended in the hot products of combustion from a region of the separating zone below the region of introduction of the reaction zone effluent into said zone and separating an increased yield per unit of feed of carbon black of unimpaired quality from the gaseous products of combustion.

11. In a process for producing carbon black in which a hydrocarbon feed stock and a preheated stream of air are introduced to a reaction zone maintained under conditions of temperature whereby combustion takes place, in which carbon black is formed in admixture with combustion gases and in which combustion gases containing carbon black and an amount of grit particles less than the maximum allowable for the ultimate use of the carbon black are withdrawn from the reaction zone, the improvement which comprises increasing the hydrocarbon feed rate so that the quantity of grit particles in the reaction zone effluent is greater than said allowable maximum, separating sufficient grit particles from said effluent to reduce the quantity of grit contained therein to below said allowable maximum and recovering an increased yield per unit of feed of carbon black product of unimpaired quality.

References Cited in the file of this patent
UNITED STATES PATENTS

| | | |
|---|---|---|
| 2,375,797 | Krejci | May 15, 1945 |
| 2,714,055 | Cines et al. | July 26, 1955 |

OTHER REFERENCES

Stokes et al.: "Chemical Industries," 64, 40–43 (1949).